(12) United States Patent
Jun et al.

(10) Patent No.: US 8,423,657 B2
(45) Date of Patent: Apr. 16, 2013

(54) TIME SLOT ALLOCATION METHOD FOR REDUCING CONSUMPTION OF ENERGY IN WIRELESS SENSOR NETWORK

(75) Inventors: Bong-Wan Jun, Seoul (KR); Jeong-Sik In, Yongin-si (KR); Eui-Jik Kim, Suwon-si (KR); Hyo-Hyun Choi, Seoul (KR)

(73) Assignee: Samsung Electronics Co., Ltd (KR)

( * ) Notice: Subject to any disclaimer, the term of this patent is extended or adjusted under 35 U.S.C. 154(b) by 665 days.

(21) Appl. No.: 12/614,044

(22) Filed: Nov. 6, 2009

(65) Prior Publication Data

US 2010/0115130 A1 May 6, 2010

(30) Foreign Application Priority Data

Nov. 6, 2008 (KR) ........................ 10-2008-0109770

(51) Int. Cl.
*G06F 15/16* (2006.01)
(52) U.S. Cl.
USPC ........................................ 709/230; 709/227
(58) Field of Classification Search .......... 709/227–228, 709/230
See application file for complete search history.

(56) References Cited

U.S. PATENT DOCUMENTS

| | | | | |
|---|---|---|---|---|
| 7,953,065 | B2 * | 5/2011 | Lysejko et al. ................ | 370/350 |
| 2003/0198244 | A1 * | 10/2003 | Ho et al. ....................... | 370/442 |
| 2006/0029024 | A1 * | 2/2006 | Zeng et al. .................... | 370/335 |
| 2009/0010218 | A1 * | 1/2009 | Tervonen et al. ............. | 370/329 |
| 2009/0034443 | A1 * | 2/2009 | Walker et al. ................. | 370/311 |
| 2010/0272076 | A1 * | 10/2010 | Cavalcanti .................... | 370/336 |

FOREIGN PATENT DOCUMENTS

| | | |
|---|---|---|
| EP | 1871041 A2 * | 12/2007 |
| WO | WO 2007/051013 A2 * | 5/2007 |

OTHER PUBLICATIONS

G. Montenegro et al., RFC 4944: Transmission of IPv6 Packets overIEEE 802,15.4 Networks, Network Working Group, IETF, Sep. 2007, 29 pages.*
Saoucene Mahfoudh et al., Performance evaluation of the SERENA algorithm to SchEdule RoutEr Nodes Activity in wireless and adhoc networks, 22$^{nd}$ Interrnational Conference on Advanced Information Networking and Applications, IEEE Computer Society, Sep. 2008, pp. 287-294.*
Samira Yessad et al., R-MAC: Reservation Medium Access Control Protocol for Wireless Sensor Networks, 32$^{nd}$ IEEE Conference on Local Computer Networks, IEEE Computer Society, Dec. 2007, pp. 719-724.*

* cited by examiner

*Primary Examiner* — Patrice Winder
(74) *Attorney, Agent, or Firm* — The Farrell Law Firm, P.C.

(57) ABSTRACT

Disclosed is a time slot allocation method for reducing consumption of energy in a wireless sensor network, including transmitting and receiving, by an upper node, a report request and a response to and from at least one lower node in order to identify whether there is data to be transmitted between the upper node and the at least one lower node, transmitting, by the upper node, information required for data transmission to the at least one lower node based on the report request and response, and transmitting and receiving, by the upper node, data to and from the at least one lower node based on the information required for data transmission.

13 Claims, 6 Drawing Sheets

TIME SLOT ALLOCATION METHOD FOR REDUCING CONSUMPTION OF ENERGY IN WIRELESS SENSOR NETWORK

PRIORITY

This application claims priority to an application entitled "Time Slot Allocation method for Reducing Consumption of Energy in Wireless Sensor Network" filed in the Korean Industrial Property Office on Nov. 6, 2008 and assigned Serial No. 10-2008-0109770, the contents of which are incorporated herein by reference.

BACKGROUND OF THE INVENTION

1. Field of the Invention

The present invention relates generally to a wireless sensor network, and more particularly to a method for transmitting/receiving required data between nodes in a wireless sensor network in which a Time Division. Multiple Access (TDMA) scheme is employed.

2. Description of the Related Art

A wireless sensor network collects remote information differently from existing communication networks. Such a wireless sensor network generally includes sensor nodes for processing and transmitting information collected through sensors, and a sink node for collecting and processing information transmitted from the sensor nodes.

Since the wireless sensor network includes many sensor nodes, the design of the sensor nodes must be simple. Also, since the sensor nodes are located in areas that are difficult to access, the sensor nodes should be designed to require low power to minimize the need for replacement. In addition, the sensor nodes should be designed to have mobility so that the location of installation is easily changeable. Furthermore, the wireless sensor network should be designed such that any damaged node does not have an influence on the maintenance of the network.

FIG. 1 illustrates a conventional wireless sensor network. In FIG. 1, each node located within a sensor network forms a network with adjacent nodes. In order to facilitate the formation of such a network, the configuration of the nodes may also be simply designed. When a network as described above is formed, an upper-lower relation is formed between nodes. Although FIG. 1 illustrates a mesh network, the relation between nodes can be formed even within the mesh network since a tree structure also exists in the mesh network.

The standard a short-range wireless network is defined in IEEE 802.15 Working Group. Particularly, the IEEE 802.15.4 standard defined by the IEEE 802.15 Working Group is thought of as a prominent core technology for application to a sensor network since it relates to the implementation of short-range wireless network with low power.

Hereinafter, a Method for transmitting/receiving data in a wireless sensor network based on the IEEE 802.15.4 standard protocol will be briefly described.

FIG. 2 illustrates data transmission/reception between nodes using time slots in a conventional wireless sensor network based on the TDMA scheme. For conciseness of the description of FIG. 2, the following describes one upper node and five lower nodes being located within a corresponding wireless sensor network, and communicating with each other.

In FIG. 2, one upper node 201 forms a connection with a plurality of lower nodes 203 to 211, which are to communicate with the upper node 201. The plurality of lower nodes, defined as first to filth lower nodes, are usually in a sleep mode so as to save energy: When a predetermined time is reached, a corresponding lower node wakes up from the sleep mode, and enters an active mode to communicate with the upper node 201. For example, when it is assumed that the upper node 201 is in communication with the first lower node 203, only the first lower node 203 has entered the active mode, and the other lower nodes 205 to 211 remain in the sleep mode. That is, the respective lower nodes 203 to 211 communicate with the upper node 201 only within each corresponding time slot, which is allocated to each of the lower nodes 203 to 211.

However, according to the allocation method, each lower node must wake up from the sleep mode and enter the active mode to communicate with the upper mode, unconditionally, within a time slot allocated to the lower node. Consequently, each lower node enters the active mode regardless of whether there is data to be transmitted, which wastes energy in a network environment in which the ratio of active mode to sleep mode is very low and an event occurs at infrequent intervals. For example, in FIG. 2, although the third lower node has no data to be reported to the upper node, the third lower node enters the active mode and communicates with the upper node when the time to enter the active mode is reached.

Accordingly, when the frequency of occurrence is low, each lower node enters the active mode to communicate with the upper node although the lower node has no data to be transmitted to the upper node, resulting in wasted energy consumption.

SUMMARY OF THE INVENTION

Accordingly, the present invention has been made to solve the above-mentioned problems occurring in the prior art, and the present invention provides a method for determining, by each lower node, whether there is data to be transmitted to an upper node, transmitting a result of the determination to the upper node, and receiving information on whether the communication is performed in a time slot and information about a communication period from the upper node based on the transmitted result in a network environment where a TDMA scheme is employed, before the lower node wakes up and communicates with the upper node in the time slot allocated to the lower node.

In accordance with the present invention, there is provided a time slot allocation method for reducing consumption of energy in a wireless sensor network, including transmitting and receiving, by an upper node, a report request and a response to/from at least one lower node in order to identify whether there is data to be transmitted between the upper node and the at least one lower node, transmitting, by the upper node, information required for data transmission to the at least one lower node based on the report request and response, and transmitting and receiving, by the upper node, data to and from the at least one lower node based on the information required for data transmission.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EMBODIMENTS

Hereinafter, embodiments of the present invention will be described with reference to the accompanying drawings. The same reference symbols are used throughout the drawings to refer to the same or like parts. Detailed descriptions of well-known functions and structures incorporated herein have been omitted for the sake of clarity and conciseness.

Figure 1:
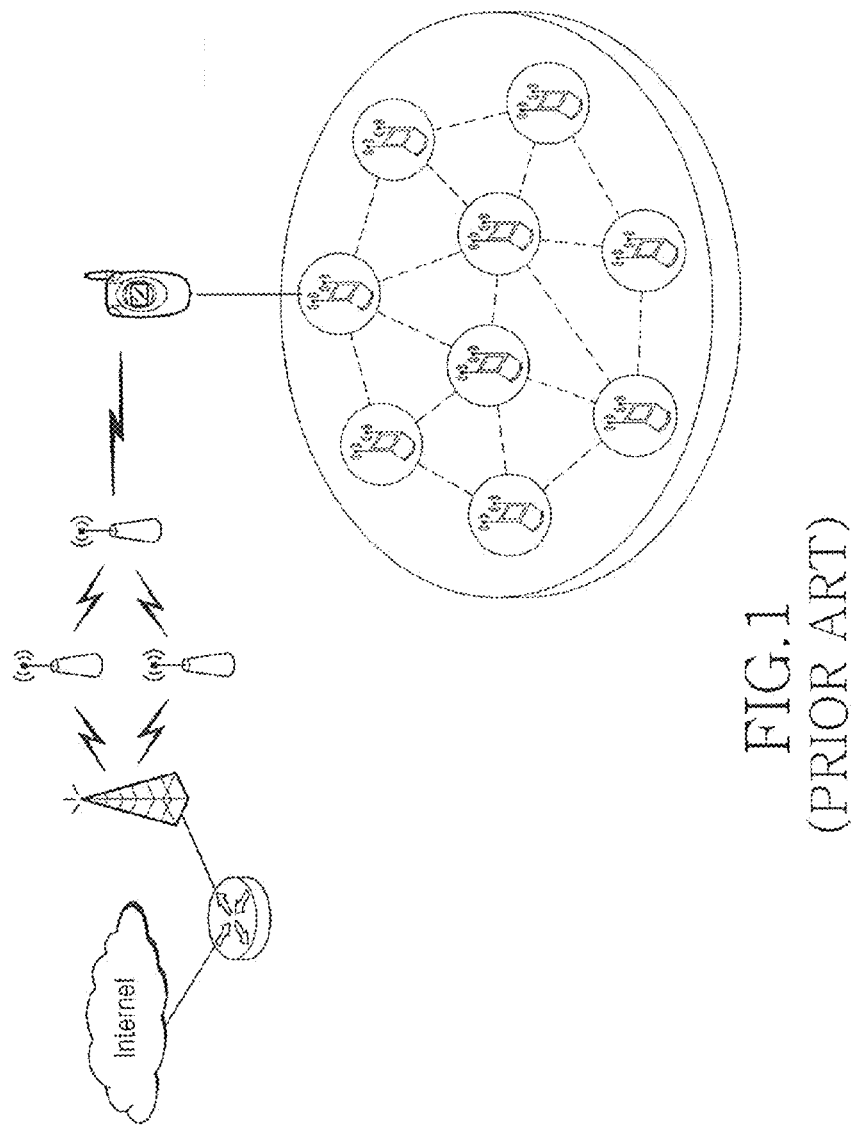
FIG. 1 illustrates a conventional wireless sensor network.
Figure 2:
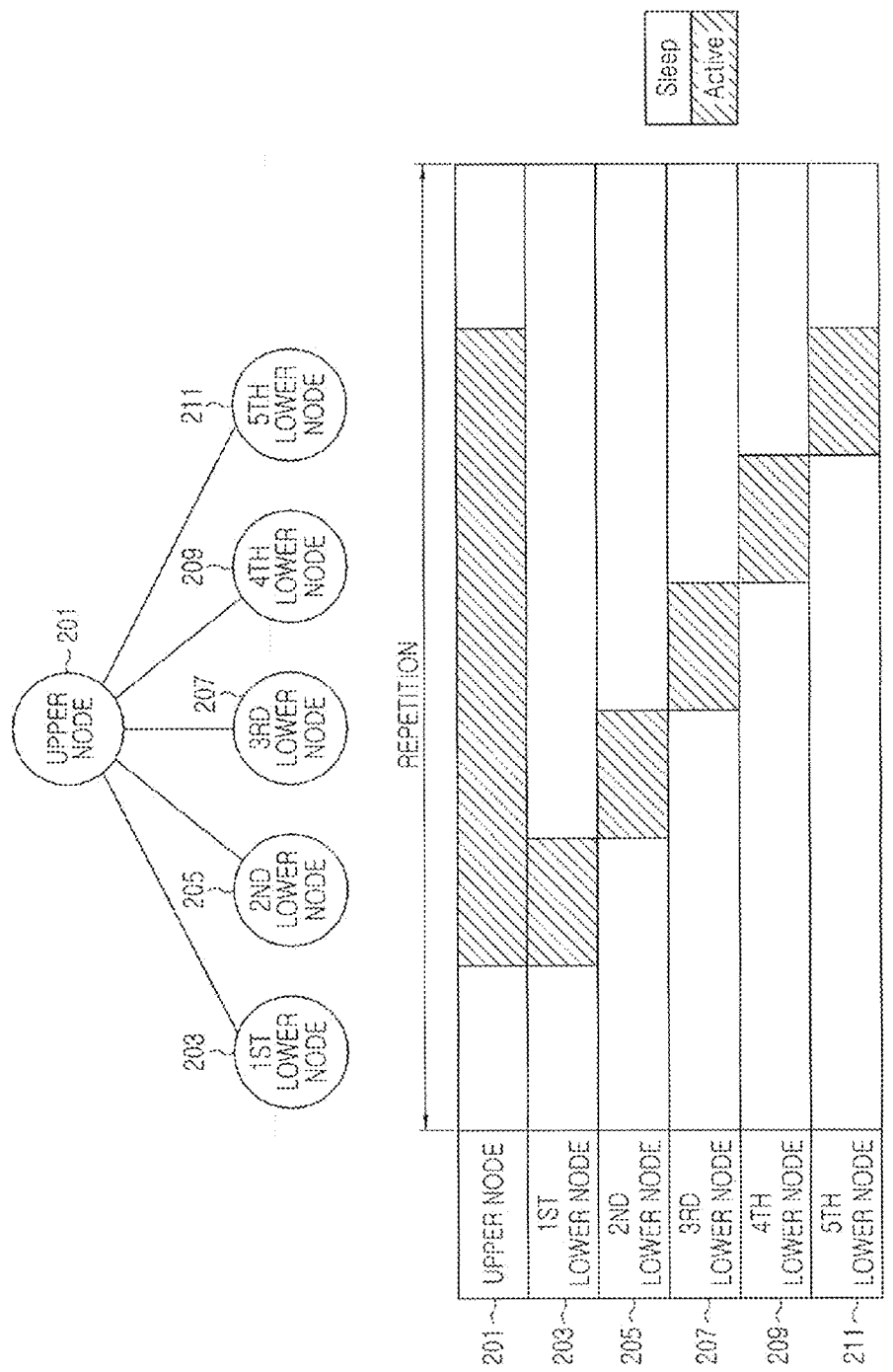
FIG. 2 illustrates data transmission/reception between nodes using time slots in a conventional wireless sensor network based on the TDMA scheme.
Figure 3:
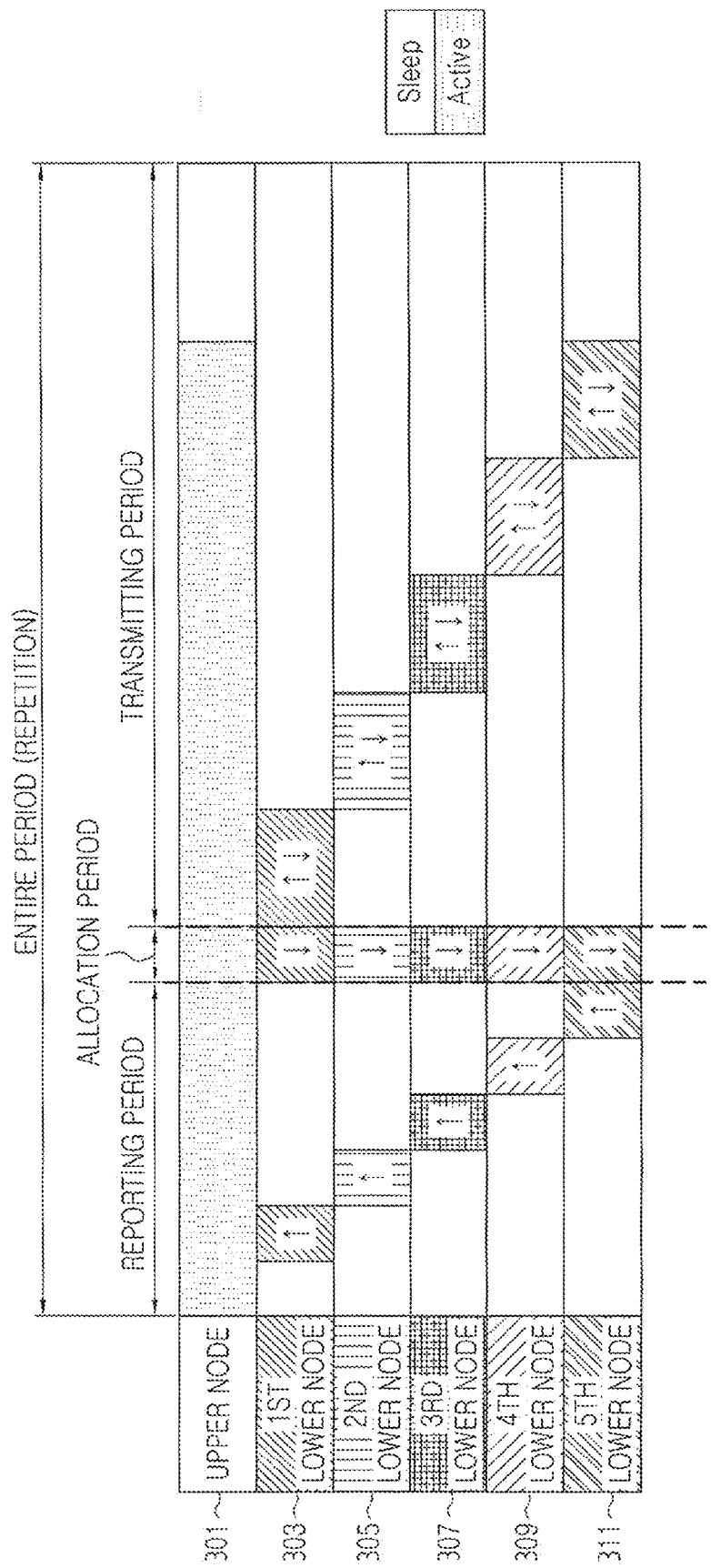
FIGS. 3 to 5 illustrate data transmission/reception between an upper node and lower nodes using time slots in a wireless sensor network, in which the TDMA scheme is employed, according to the present invention.
Figure 4:
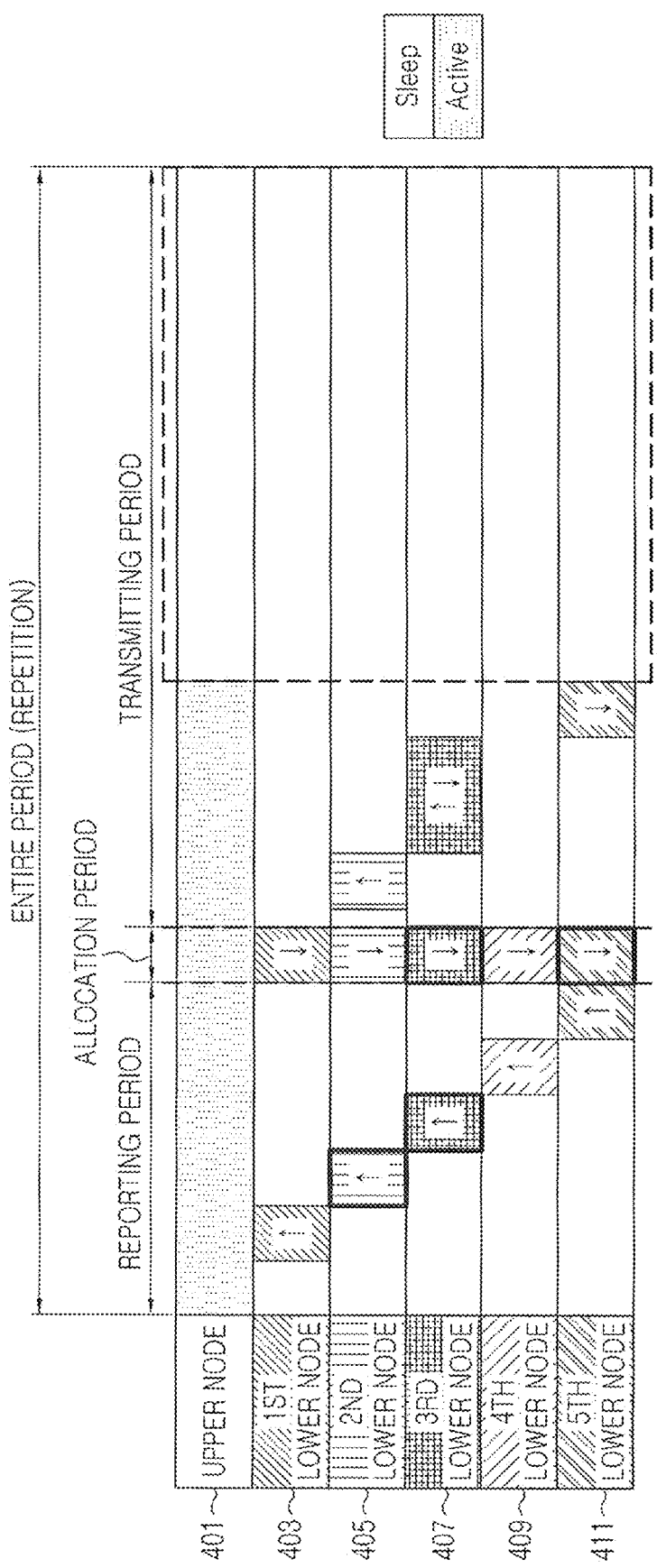
Figure 5:
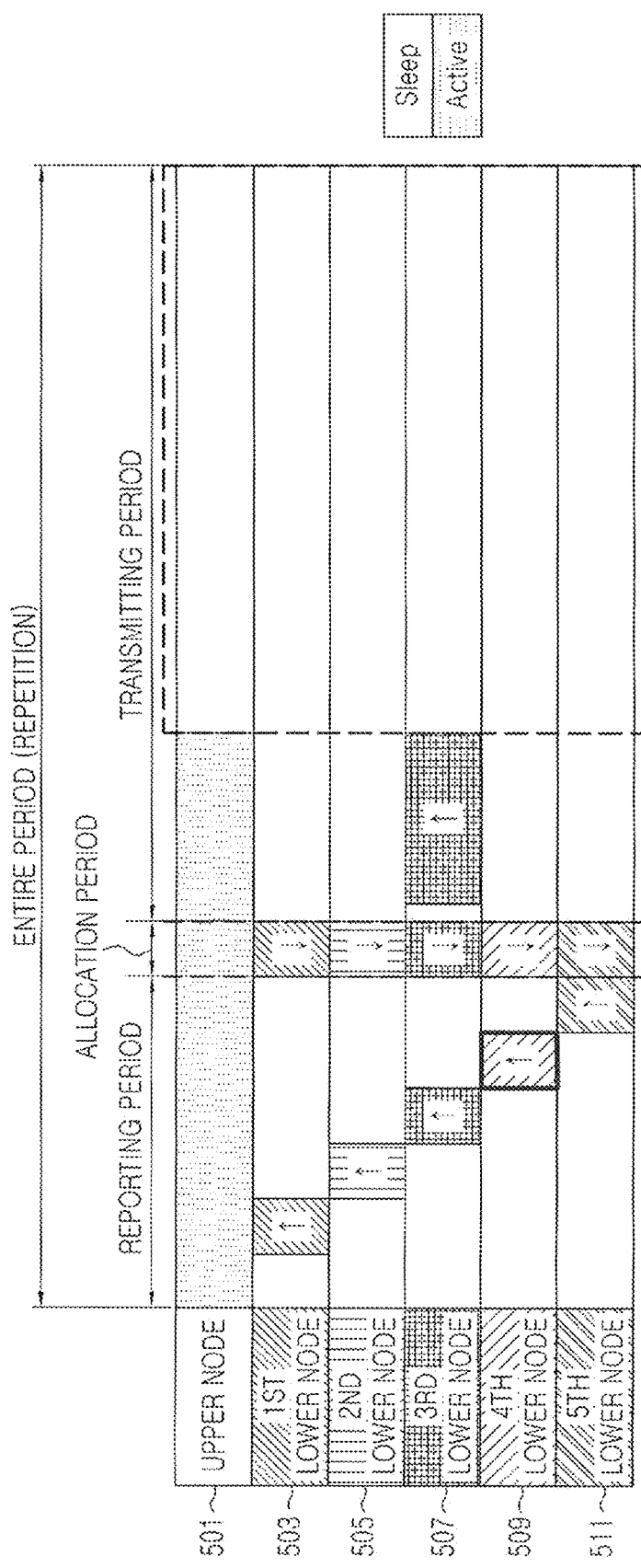

According to the conventional communication method between an upper node and lower nodes, each lower node unconditionally enters an active mode and communicates with the upper node within a time slot to the lower node, regardless of whether there is data to be transmitted, resulting in wasted energy consumption. To solve this problem, the present invention discloses a method for determining, by each lower node, whether there is data to be transmitted to an upper node, transmitting the result of the determination to the upper node, and receiving information on whether the communication is performed in a time slot and information about the communication period from the upper node based on the transmitted result in a network environment where a TDMA scheme is employed, before the lower node wakes up and communicates with the upper node in the time slot allocated to the lower node, thereby reducing energy waste:

FIGS. 3 to 5 illustrate data transmission/reception between an upper node and lower nodes using time slots in a wireless sensor network, in which a TDMA scheme is employed, according to the present invention. In FIG. 3, every node has data to be transmitted; in FIG. 4 one or more nodes have no data to be transmitted, and only one node has data to be transmitted in FIG. 5. Similarly in FIG. 2, for the convenience of description of FIGS. 3 to 5, the following description will be given on a case Where one upper node and five lower nodes are located within a corresponding wireless sensor network and communicate with each other.

Referring to FIG. 3, one upper node 301 forms a connection with a plurality of lower nodes 303 to 311, which are to communicate with the upper node 301. The plurality of lower nodes are defined as first to fifth lower nodes.

The first to fifth lower nodes 303 to 311 are usually in the sleep mode so as to save energy, and whenever a predetermined time is reached, a corresponding lower node wakes up from the sleep mode and enters an active mode to communicate with the upper node 301. Here, a reporting period and an allocation period are introduced before a transmitting period for communication between the upper node 301 and the lower nodes 303 to 311, and it is determined whether the lower nodes are to enter the active mode according to each lower node. The following description gives a full detail of the two periods.

When a connection between the upper node 301 and the first to fifth lower nodes 303 to 311 has been formed, and a reporting period has been set, the respective lower nodes 303 to 311 identify and report whether there is data to be transmitted to the upper node 301 at sequential time periods.

When the process of reporting whether there is data to be transmitted to the upper node 301 has been completed from the first lower node 303 to the fifth node 311, the reporting period is terminated, and an allocation period starts. When entry into the allocation period is made, the upper node 301 determines whether the lower nodes 303 to 311 have data to be transmitted and whether there is data to be transmitted to the lower nodes 303 to 311, creates a time slot policy which includes information resulting from the determination and identification, and broadcasts the time slot policy to the lower nodes 303 to 311. Through the policy, each of the lower nodes 303 to 311 is notified of a time point to wake up from the sleep mode and to transmit data to the upper node 301, and of a time period required for transmitting data. Thereafter, when entry into a transmitting period is made, the upper node 301 and each lower node 303 to 311 communicate with each other during a predetermined time period from a predetermined time point based on the policy notified in advance. The operations form a cycle, and are repeatedly performed based on the cycle.

In FIG. 4, a first lower node 403 and a fourth lower node 409 have no data to be received from the upper node 401 or to be transmitted to the upper node 401, a second lower node 405 has only data to be transmitted to the upper node 401, and a fifth lower node 411 has only data to be received from the upper node 401.

As shown in FIG. 4, since the data transmission for the first lower node 403 and the fourth lower node 409 in the transmitting period has not been reserved through the reporting and allocation periods, the first lower node 403 and the fourth lower node 409 do not enter the active mode, and remain in the sleep mode. Thus, the upper node 401 reenters the sleep mode at an earlier time.

Also, the time periods in which the second lower node 405 and fifth lower node 411 remain in the active mode have been adjusted through the reporting and allocation periods, so that the time periods in which the second lower node 405 and fifth lower node 411 wake up are reduced according to the amount of data to be transmitted/received. This also indicates that the upper node 401 reenters the sleep mode at an earlier time.

Accordingly, the frequency of the use of energy is greatly reduced, as compared with the case of FIG. 2 where every lower node must unconditionally wake up from the sleep mode regardless of whether there is data to be transmitted.

In FIG. 5, time periods in which lower nodes 503 to 511 wake up from the sleep mode and transmit data can be adjusted by a time slot policy, which is transmitted from an upper node 501 to the lower nodes 503 to 511.

Referring to FIG. 5, it is assumed that only the fourth lower node 509 has data to be transmitted to the upper node 501, and the amount of data to be transmitted is relatively large. The upper node 501 and the fourth lower node 509 extract a time period corresponding to the amount of data to be transmitted from the fourth lower node 509, while passing through the reporting and allocation periods, set the transmitting period, and communicate with each other. In this case, a time slot longer than that normally allocated to a lower node can be allocated, and the data is transmitted to the upper node 501 through the allocated time slot. Accordingly, it is possible to solve a delay problem in data transmission, which is caused by waiting for the next cycle and then transmitting data, as in the method of FIG. 2 of allocating every lower node with a fixed-sized time slot every time.

Figure 6:
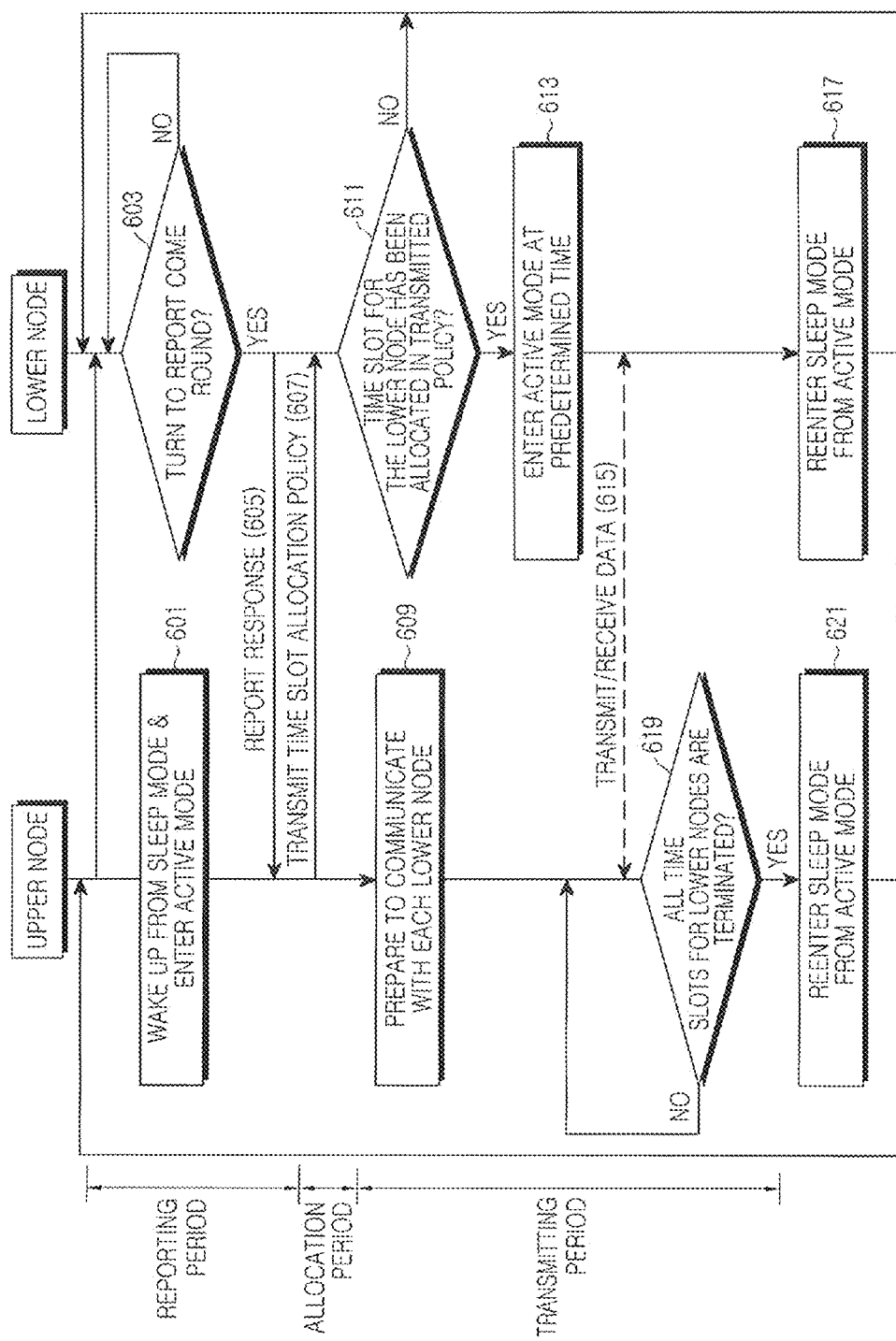
FIG. 6 illustrates a procedure of transmitting/receiving data between an upper node and lower nodes using time slots in a wireless sensor network, in which a TDMA scheme is employed, according to the present invention.

FIG. 6 illustrates a procedure of transmitting/receiving data between an upper node and lower nodes using time slots in a wireless sensor network in which a TDMA scheme is employed according to the present invention.

Referring to FIG. 6, in step 601, when a repotting period begins with the start of a new cycle, an upper node wakes up from the sleep mode and enters the active mode, and prepares to receive reports informing the upper node whether there is transmission data from lower nodes. In step 603, a corresponding lower node determines whether the time to send a report to the upper node is reached, and reports whether there are data packets to be transmitted to the upper node at a preset time. In step 605, when every lower node has completed reporting to the upper node, the reporting period is terminated, and the allocation period starts.

When the procedure proceeds to step 607 of entering the allocation period, the upper node creates a time slot allocation policy based on one or more reports transmitted from one or more lower nodes, and on whether there is data to be transmitted to each lower node, and then broadcasts the time slot allocation policy to the lower nodes. Through the policy, each lower node is notified of a time point for the lower node to wake up from the sleep mode and to enter the active Mode so as to transmit/receive data to/from the upper node, and is notified of a time period during which the lower node stays in the active mode. When every lower node has been notified of the time slot allocation policy, as described above, the allocation period is terminated, and a transmitting period starts.

When the transmitting period starts, the upper node prepares to communicate with each lower node based on the time slot allocation policy, as shown in step 609, and each lower node analyzes the transmitted policy and determines whether a time slot is allocated to the lower node, as shown in step 611. When a lower node is allocated with no time slot, the lower node is maintained in the sleep mode until the next cycle starts. In contrast, when a lower node is allocated with a time slot, the lower node proceeds to step 613, where the lower node enters the active mode at a determined time so as to transmit/receive data to/from the upper node. Thereafter, data is transmitted/received between the upper node and the lower node in step 615. When data transmission/reception between the upper node and the lower node has been terminated, the lower node proceeds to step 617, where the lower node reenters the sleep mode.

In step 619, the upper node repeatedly determines whether all the time slots for the lower nodes have been terminated during a time period. In step 621, when all the time slots for the lower nodes have been terminated, the upper node also reenters the sleep mode from the active mode.

As described with reference to the flowchart, the upper node determines whether there is data to be transmitted between the upper node and the lower nodes through the use of the reporting and allocation periods, and controls time slots to be allocated to the lower nodes, so that unnecessary consumption of energy is reduced and energy saving is maximized.

While the invention has been shown and described with reference to certain embodiments thereof, it will be understood by those skilled in the art that various changes in form and detail may be made therein without departing from the spirit and scope of the invention as defined by the appended claims. Accordingly, the scope of the invention is not to be limited by the above embodiments but by the claims and the equivalents thereof.

What is claimed is:

1. A time slot allocation method for reducing consumption of energy in a wireless sensor network, the method comprising the steps of:
    receiving, by an upper node, reports from a plurality of lower nodes, respectively, each report indicating whether there is data to be transmitted to the upper node from a respective lower node;
    generating, by the upper node, a time slot allocation policy for data transmission between the upper node and the plurality of lower nodes, based on the received reports;
    transmitting, by the upper node, the time slot allocation policy to the plurality of lower nodes; and
    transmitting and receiving, by the upper node, data to and from at least one of the plurality of lower nodes based on the time slot allocation policy,
    wherein the time slot allocation policy indicates, for each of the plurality of lower nodes, one of (1) an interval for entering an active mode for data transmission, when there is data to be transmitted between the upper node and a respective lower node, and (2) to remain in a sleep mode, when there is no data to be transmitted between the upper node and a respective lower node.

2. The method as claimed in claim 1, further comprising:
    entering, by the upper node, an active mode from a sleep mode so as to receive the reports from the plurality of lower nodes.

3. The method as claimed in claim 2, further comprising transmitting, by the upper node, information notifying the plurality of lower nodes to start transmitting the reports.

4. The method as claimed in claim 2, wherein the reports are sequentially received by the upper node from the plurality of lower nodes, in an order from a lower node first receiving the information notifying to start transmitting the reports to a lower node lastly receiving the information notifying to start transmitting the reports.

5. The method as claimed in claim 1, wherein generating the time slot allocation policy comprises:
    calculating a data transmission and reception timing for each of the plurality of lower nodes, and a time period required for transmission of data, based on information collected through the reports; and
    generating the time slot allocation policy based on the calculated data transmission and reception timing and the calculated time period required for transmission of the data.

6. The method as claimed in claim 1, wherein the time slot allocation policy is simultaneously transmitted to the plurality of lower nodes.

7. An upper node apparatus for a wireless sensor network, the apparatus comprising:
    a transceiver that receives reports from a plurality of lower nodes, respectively, each report indicating whether there is data to be transmitted to the upper node from a respective lower node; and
    a controller that generates a time slot allocation policy for data transmission between the upper node and the plurality of lower nodes, based on the received reports, controls the transceiver to transmit the time slot allocation policy to the plurality of lower nodes, and controls the transceiver to transmit and receive data to and from at least one of the plurality of lower nodes, based on the time slot allocation policy,
    wherein the time slot allocation policy indicates, for each of the plurality of lower nodes, one of (1) an interval for entering an active mode for data transmission, when there is data to be transmitted between the upper node and a respective lower node, and (2) to remain in a sleep mode, when there is no data to be transmitted between the upper node and a respective lower node.

8. The apparatus as claimed in claim 7, wherein the controller controls the apparatus to enter an active mode from a sleep mode so as to receive the reports from the plurality of lower nodes.

9. The apparatus as claimed in claim 8, wherein the controller controls the transceiver to transmit information notifying the plurality of lower nodes to start transmitting the reports.

10. The apparatus as claimed in claim 8, wherein the reports are sequentially received by the transceiver from the plurality of lower nodes, in an order from a lower node first receiving the information notifying to start transmitting the reports to a lower node lastly receiving the information notifying to start transmitting the reports.

11. The apparatus as claimed in claim 7, wherein the controller calculates a data transmission and reception timing for each of the plurality of lower nodes, and a time period required for transmission of the data, based on information collected through the reports, and generates the time slot allocation policy based on the calculated data transmission and reception timing and the calculated time period required for transmission of the data.

12. The apparatus as claimed in claim 7, wherein-the time slot allocation policy is simultaneously transmitted to the plurality of lower nodes.

13. A lower node apparatus for a wireless sensor network, the apparatus comprising:

a transceiver that transmits, to an upper node, a report indicating whether there is data to be transmitted to the upper node; and a controller that determines whether there is the data to be transmitted to the upper node, generates the report, receives a time slot allocation policy from the upper node via the transceiver, and determines whether to enter into an active mode from a sleep mode, based on the time slot allocation policy, wherein the time slot allocation policy indicates one of (1) that the apparatus should enter into the active mode for data transmission, when there is data to be transmitted between the upper node and the apparatus, and (2) that the apparatus should remain in the sleep mode, when there is no data to be transmitted between the upper node and the apparatus.

\* \* \* \* \*